(12) United States Patent
Marushima et al.

(10) Patent No.: US 7,886,723 B2
(45) Date of Patent: Feb. 15, 2011

(54) MULTIPURPOSE ENGINE

(75) Inventors: Hiroyoshi Marushima, Sagamihara (JP); Chikaya Ito, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 78 days.

(21) Appl. No.: 12/261,910

(22) Filed: Oct. 30, 2008

(65) Prior Publication Data
US 2009/0194077 A1 Aug. 6, 2009

(30) Foreign Application Priority Data
Jan. 31, 2008 (JP) ............................. 2008-020930

(51) Int. Cl.
*F02M 33/04* (2006.01)
*F02M 33/02* (2006.01)

(52) U.S. Cl. ...................................... 123/519; 123/520

(58) Field of Classification Search .................. 123/519, 123/520, 518, 517, 516; 137/587, 588, 589, 137/493, 43
See application file for complete search history.

(56) References Cited

U.S. PATENT DOCUMENTS

| | | | | |
|---|---|---|---|---|
| 3,221,724 A | * | 12/1965 | Wentworth | 123/519 |
| 3,540,423 A | * | 11/1970 | Tolles | 123/519 |
| 4,085,721 A | * | 4/1978 | Vardi et al. | 123/520 |
| 5,259,412 A | * | 11/1993 | Scott et al. | 137/588 |
| 5,386,812 A | * | 2/1995 | Curran et al. | 123/520 |
| 5,408,977 A | | 4/1995 | Cotton | |
| 5,427,076 A | * | 6/1995 | Kobayashi et al. | 123/520 |
| 6,736,871 B1 | * | 5/2004 | Green et al. | 55/385.3 |
| 6,959,696 B2 | * | 11/2005 | Shears et al. | 123/516 |
| 7,014,258 B2 | | 3/2006 | Schubring et al. | |
| 7,104,258 B2 | | 9/2006 | Yamada et al. | |
| 2005/0121004 A1 | * | 6/2005 | Yamada et al. | 123/519 |
| 2006/0196481 A1 | * | 9/2006 | Mills et al. | 123/519 |
| 2006/0207575 A1 | * | 9/2006 | Mills | 123/519 |
| 2007/0068388 A1 | * | 3/2007 | Shears et al. | 96/134 |
| 2008/0202479 A1 | | 8/2008 | Ito et al. | |

FOREIGN PATENT DOCUMENTS

| | | |
|---|---|---|
| JP | 3-32773 | 3/1985 |
| JP | 7-34985 A | 2/1995 |
| JP | 2597081 B2 | 3/1995 |
| JP | 2005-163690 A | 6/2005 |
| JP | 2005163688 A | 6/2005 |
| JP | 2008-208789 A | 9/2008 |

* cited by examiner

*Primary Examiner*—Mahmoud Gimie
(74) *Attorney, Agent, or Firm*—Birch, Stewart, Kolasch & Birch, LLP

(57) ABSTRACT

In this multipurpose engine, a fuel gas evaporated within a fuel tank of the engine is drawn out of the fuel tank and is adsorbed by an adsorbing material, the fuel gas is separated from the adsorbing material, and then the fuel gas separated from the adsorbing material is suctioned into an intake system of the engine by using negative pressure inside the intake system. The adsorbing material is accommodated in a canister, and two connection ports used for connection with the canister are respectively provided at a heat-insulating intake pipe between a carburetor and the engine and at a clear section of an air cleaner.

2 Claims, 3 Drawing Sheets

MULTIPURPOSE ENGINE

CROSS-REFERENCE TO RELATED APPLICATIONS

Priority is claimed on Japanese Patent Application No. 2008-20930, filed Jan. 31, 2008, the content of which is incorporated herein by reference.

BACKGROUND OF THE INVENTION

1. Field of the Invention

The present invention relates to a multipurpose engine in which a fuel gas evaporated within a fuel tank is adsorbed by an adsorbing material and the fuel gas separated from the adsorbing material is sucked into an intake system of the engine.

2. Description of Related Art

A conventional multipurpose engine with a canister disclosed in Japanese Unexamined Patent Application, First Publication No. 2005-163690 accommodates an adsorbing material which adsorbs the fuel gas evaporated within a fuel tank. The multipurpose engine with a canister includes a canister which adsorbs the fuel gas which leaks out from around a cap of the fuel tank, and returns the fuel gas to an intake system, and piping which takes the fuel gas into the canister is opened near an oil supply port of the fuel tank. This piping is coupled to the canister through the bottom of the tank from the inside of the fuel tank, and the fuel gas is charged and guided into the intake system through this piping. It is an aim of the prior art to shorten the piping for recovered fuel gas and to simplify attachment thereof to the intake system.

A conventional multipurpose engine disclosed in Japanese Unexamined Patent Application, First Publication No. H07-34985 includes an adsorption means which adsorbs the fuel gas evaporated within a fuel tank. As the multipurpose engine, a structure in which an adsorbing material is accommodated in a chamber (equivalent to a canister) formed in a lid for a fuel filling port of a fuel tank, the fuel gas separated through a gas-liquid separation chamber is made to be adsorbed by an adsorbing material within an adsorbing material chamber, and the degassed fuel gas is sucked into an intake system pipe by using the intake negative pressure of the engine is suggested. In addition, a structure in which a block of an adsorbing material is adjacent to the downstream section of a filter element of an air cleaner, and the fuel gas separated through a gas-liquid separation chamber from a fuel tank is directly delivered to the adsorbing material block, and the fuel gas is adsorbed by the adsorbing material, thereby performing degassing of the fuel gas is suggested.

When the fuel within the fuel tank is consumed by the operation of the engine, the pressure inside the fuel tank becomes negative, and thereby the fuel supply to the intake system is not smoothly performed. In the conventional multipurpose engine with a canister disclosed in the above 2005-163690, a liquid check valve which is adapted to keep a liquid fuel from leaking even if ambient air can be introduced into a fuel supplying cap of the tank, and through which gas can pass is provided. Further, the tip of the piping which feeds the fuel gas into, for example, the intake system is opened to an attachment portion of the cap, and this piping passes through a tank wall via the inside of the tank. Thus, a leak-preventing sealing means is provided between the piping and the wall. As a result, the structure is complicated, the cost is high, and the maintenance is not easy, either.

In the conventional multipurpose engine disclosed in the above 07-34985 having the adsorption devices, a valve body of a float valve through which liquid is checked, and gas can pass is fixed to an attachment opening of the cap. Further, the cap with which the canister is integrated is large. Therefore, the layout of parts in an engine is not simple, and the fuel supply operation can not be smoothly performed. On the other hand, in a case where the adsorbing material is provided adjacent to the filter element of the air cleaner, the introduction resistance of sucked air may become large, and may have influence on engine output.

The object of the invention is to solve these problems, and provide a multipurpose engine including a fuel gas adsorption device, which is simple and inexpensive in construction, and is easy to maintain.

SUMMARY OF THE INVENTION

A first aspect of the present invention is a multipurpose engine in which a fuel gas evaporated within a fuel tank of the engine is drawn out of the fuel tank and is adsorbed by an adsorbing material, the fuel gas is separated from the adsorbing material, and then the fuel gas separated from the adsorbing material is suctioned into an intake system of the engine by using negative pressure inside the intake system. The adsorbing material is accommodated in a canister, and two connection ports used for connection with the canister are respectively provided at a heat-insulating intake pipe between a carburetor and the engine and at a clear section of an air cleaner.

In the first aspect of the multipurpose engine of the present invention, a side face of the canister may be provided with a charge piping connection port to which charge piping of the fuel gas fed from the fuel tank is connected, and a purge piping connection port connected to the connection port provided in the heat-insulating intake pipe. Further, a side face of the canister opposite to where the charge piping is connected may be provided with a suction port for a suction pipe connected to the clear section of the air cleaner having a negative pressure smaller than the negative pressure inside the heat-insulating intake pipe.

In the first aspect of the multipurpose engine of the present invention, a filter element may be provided at an upstream section of an adsorbing material block of the canister so as to be adjacent to the adsorbing material block. Further, a side face of the canister may be provided with a charge piping connection port to which charge piping of the fuel gas is connected, and a purge piping connection port connected to a clear section in which the negative pressure of the air cleaner is generated. Furthermore, a suction port which is opened to ambient air may be provided at an upstream section of the filter element and. In addition, the connection port provided at the heat-insulating intake pipe may be blocked.

A second aspect of the present invention is a multipurpose engine in which a fuel gas is drawn out of a fuel tank and is adsorbed by an adsorbing material, the fuel gas is separated from the adsorbing material, and then the fuel gas separated from the adsorbing material is suctioned into an intake system of the engine. The multipurpose engine includes an adsorbing material block which is provided at an downstream section of a filter element inside an air cleaner so as to be adjacent to the filter element and which is opened to the inside of the air cleaner, and a charging pipe for drawing the fuel gas evaporated within the fuel tank out from the fuel tank. The adsorbing material block includes the adsorbing material therein and is formed so as not to narrow an air passage of the air cleaner. The charging pipe is opened to the adsorbing material block.

In the multipurpose engine, the fuel gas is drawn out of the fuel tank and is adsorbed by the adsorbing material, the fuel gas is separated from the adsorbing material, and then the fuel gas separated from the adsorbing material is suctioned into an intake system of the engine.

A third aspect of the present invention is a multipurpose engine in which a fuel gas is drawn out of a fuel tank and is adsorbed by an adsorbing material, the fuel gas is separated from the adsorbing material, and then the fuel gas separated from the adsorbing material is auctioned into an intake system of the engine. The multipurpose engine includes an air passage which is provided between an air cleaner and a carburetor and a connecting intake pipe for holding an adsorbing material block including the adsorbing material therein and which is opened to the air passage. A charging pipe for drawing the fuel gas evaporated within the fuel tank out from the fuel tank is connected to the connecting intake pipe. In the multipurpose engine, the fuel gas is drawn out of the fuel tank and is adsorbed by the adsorbing material, the fuel gas is separated from the adsorbing material, and then the fuel gas separated from the adsorbing material is auctioned into an intake system of the engine.

According to the first aspect of the multipurpose engine of the invention, it is possible to cope with a canister in which a filter element is built or a canister in which a filter element is not built, without adding parts by properly using two ports on the side of an engine. Accordingly, a canister which recovers a fuel gas leaked from a fuel tank can be attached, without considerably remodeling a standard multipurpose engine. As a result, a multipurpose engine which is easy to maintain can be provided at a low cost.

According to the second and third aspects of the multipurpose engine of the invention, the adsorbing material block can be provided and accommodated in an air passage between an air cleaner and a carburetor so as not to narrow the air passage. Thus, the number of gas pipes decreases, and the layout of parts is simplified. Moreover, since the flow resistance of an intake system passage does not increase, a fuel gas leaked from a fuel tank can be recovered without reducing engine power.

DESCRIPTION OF THE PREFERRED EMBODIMENTS

First Embodiment

Figure 1:
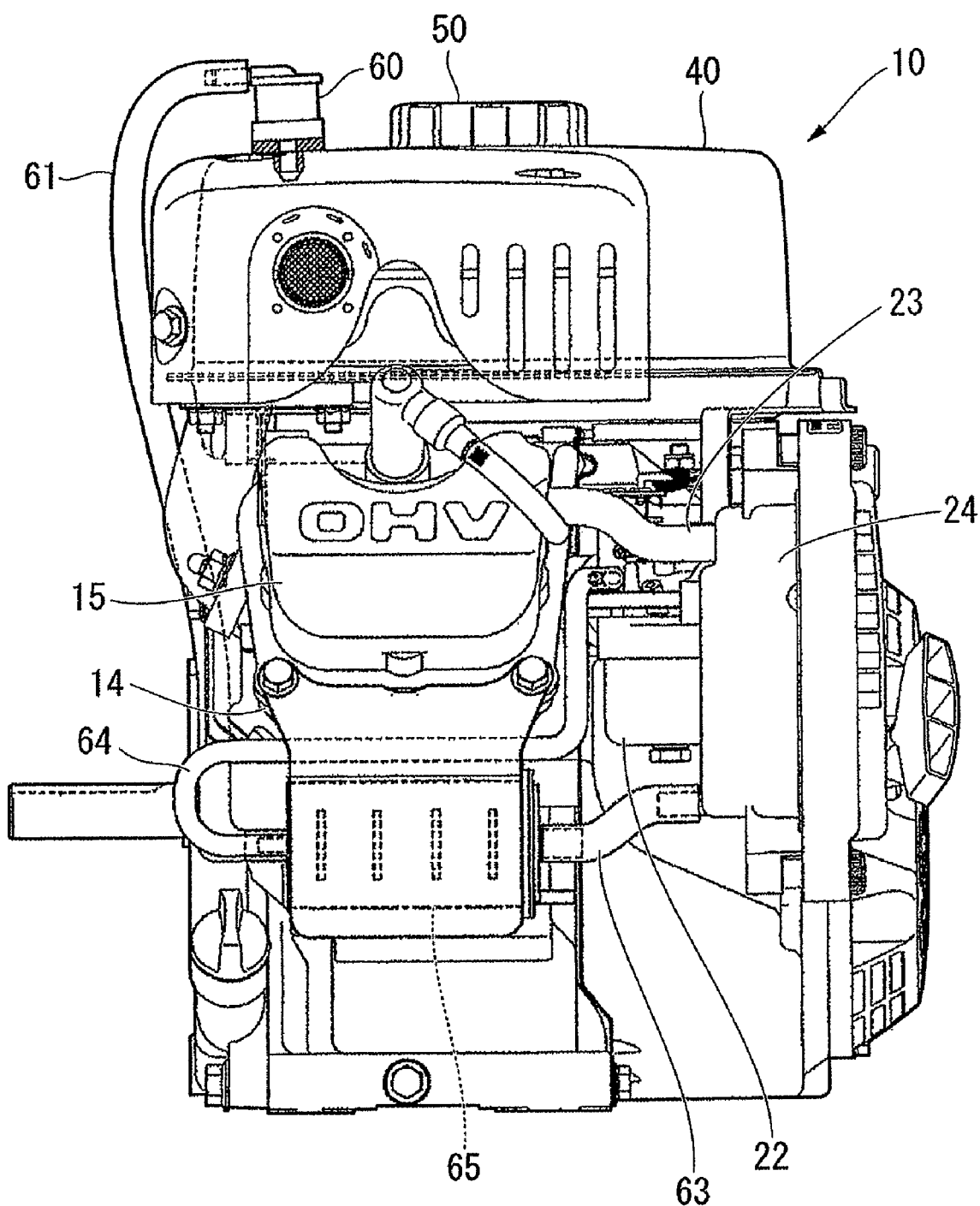
FIG. 1 is a side view of a multipurpose engine with a canister related to embodiments of the invention.
Figure 2:
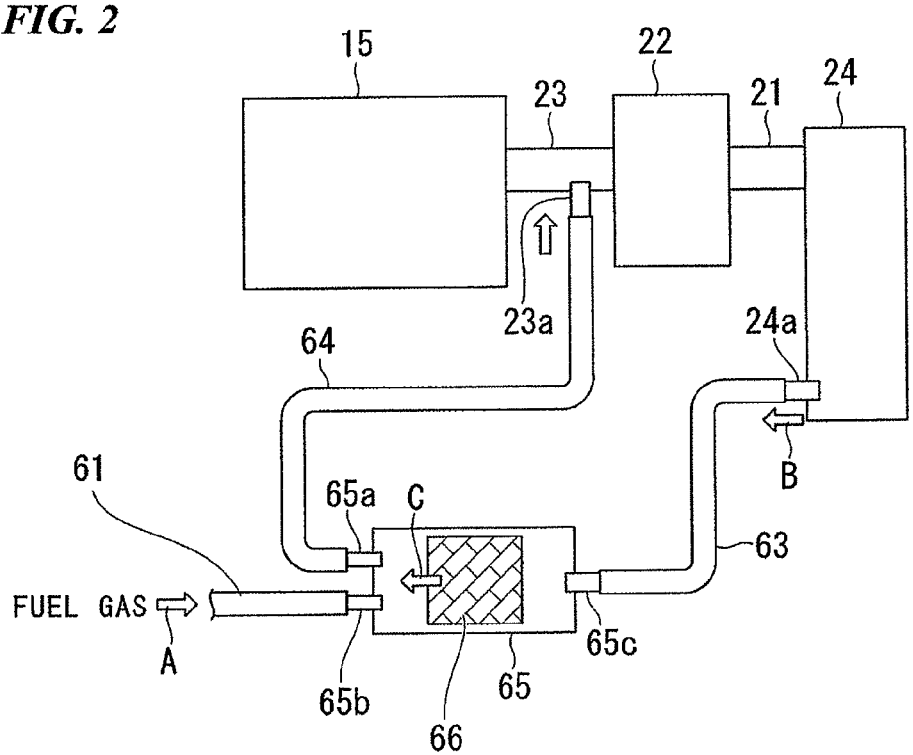
FIG. 2 is a schematic view showing a fuel gas piping system around a canister to be attached to the engine of FIG. 1 related to a first embodiment of the invention.

FIG. 1 is a side view of a multipurpose engine with a canister related to the present embodiment, and FIG. 2 is a schematic view showing a fuel gas piping system around a canister to be attached to the engine of FIG. 1 related to the first embodiment of the invention.

The multipurpose engine 10 shown in FIG. 1 is an engine of a general-purpose air-cooling four-cycle single cylinder which is loaded on, for example, a fieldwork machine and in which the cylinder is inclined. An intake system of the multipurpose engine 10 includes a heat-insulating intake pipe 23 connected to a combustion chamber 15 of a cylinder head 14, a carburetor 22 connected to the heat-insulating intake pipe 23, and a connecting suction pipe 21 and an air cleaner 24 which are attached to the upstream of the carburetor 22. The intake system is located at a side face of the inclined cylinder.

A fuel tank 40 is disposed on the upside of the multipurpose engine 10, and a detachable cap 50 is tightly screwed onto an oil hole of an upper face of the fuel tank 40. Further, a rollover valve 60 is set on the upper face of the fuel tank 40. Thereby, it is possible to pass the fuel gas which evaporates in the fuel-tank 40 to a canister 65 via a charge tube 61. Also, it is possible to pass ambient air from the charge tube 61 to the fuel tank 40. Even when the multipurpose engine 10 is inclined, and accordingly the fuel tank 40 inclines and the liquid fuel reaches a vent hole of the rollover valve 60, the valve is closed by the operation of a float provided in the rollover valve 60, thereby adding the function in which the liquid fuel is not leaked to the charge tube 61. A fuel pipe which feeds fuel to the carburetor 22 is attached to a lower portion of the fuel tank 40.

While the multipurpose engine 10 is operated, fuel is continuously fed to the carburetor 22 through the fuel pipe by an oil-level head difference between the fuel level inside the fuel-tank 40 and the carburetor 22, and the inside of the fuel tank 40 has slightly negative pressure. Thus, fuel gas does not leak to the outside. When the multipurpose engine 10 stops, supply of the fuel to the carburetor 22 stops, the fuel gas within the fuel tank 40 continues evaporating by the remaining heat of the multipurpose engine 10, and the steam pressure becomes positive pressure. As a result, the fuel gas may leak out from a slight gap of pipes.

In the multipurpose engine 10 including the canister 65, the fuel gas leaks out of the fuel tank 40 through the rollover valve 60 and the charge tube 61. Then, the fuel gas enters the canister 65, and is adsorbed by an adsorbing material, such as activated carbons built in the canister 65. Therefore, even when the multipurpose engine 10 is being operated and is being stopped, the fuel gas does not leak out to the surroundings.

There is a limit to the amount of fuel gas adsorption of the adsorbing material built in the canister 65. Then, a purge pipe 64 is piped from the canister 65 to the intake system. While the multipurpose engine 10 operates, the fuel gas is degassed using the negative pressure of the intake system, discharged from the canister 65, and recovered to the intake system. Thereby, recycling of the canister 65 is performed. After the multipurpose engine 10 has stopped, the fuel tank 40 is warmed by the remaining heat for a while. Thus, the fuel evaporates to generate fuel gas, the internal pressure of the fuel tank 40 rises, and leakage of the fuel gas occurs. Although the leaked fuel gas is adsorbed by the adsorbing material of the canister 65, generation of the fuel gas decreases when the multipurpose engine 10 gets cold. The amount of the adsorbing material within the canister 65 is determined to be more than the amount of adsorption calculated on the basis of the stopping time of the multipurpose engine 10.

With reference to the schematic view of FIG. 2, the layout of fuel gas piping which leads to the intake system from the canister 65, and the adsorption process of fuel gas will be described.

An inlet port 65b of the canister 65 is connected with the inside of the fuel tank 40 via the rollover valve 60 and the charge tube 61. An outlet port 65a of the canister 65 is connected with a suction port 23a of the heat-insulating intake pipe 23 via the purge pipe 64. A port 65c at the air section of the canister 65 is connected with a port 24a communicating with a clear section of an air cleaner 24 via a suction pipe 63. A adsorbing material block 66 to which a porous adsorbing material is attached is built inside the canister 65.

After the multipurpose engine 10 has stopped, the fuel tank 40 is warmed by the remaining heat for a while. Thus, the fuel evaporates to generate fuel gas, the internal pressure of the fuel tank 40 rises, and leakage of the fuel gas occurs. The leaked fuel gas enters the canister 65 through the charge tube 61 (see an arrow A in the drawing), and is adsorbed by the adsorbing material of the adsorbing material block 66.

When the multipurpose engine 10 operates, negative pressure is generated in the intake system. The negative pressure increases toward the suction port of the multipurpose engine 10. By the negative pressure inside the heat-insulating intake pipe 23 where the largest negative pressure is generated, the air at the clear section of the air cleaner 24 is sucked into the canister 65 through the suction pipe 63 (refer to an arrow B in the drawing). The fuel gas adsorbed by the adsorbing material block 66 is degassed by the sucked air (see the arrow C in a drawing). The degassed fuel is sucked into the heat-insulating intake pipe 23 through the purge pipe 64. Thereby, the fuel gas is recovered, and the canister 65 is recycled. In addition, although negative pressure is also applied to the fuel tank 40 by the negative pressure of the heat-insulating intake pipe 23, evaporation of the fuel by the negative pressure is slight, scarcely has an effect on an adsorption action of the adsorbing material block 66, and is effective in eliminating fuel gas leakage.

Second Embodiment

Figure 3:
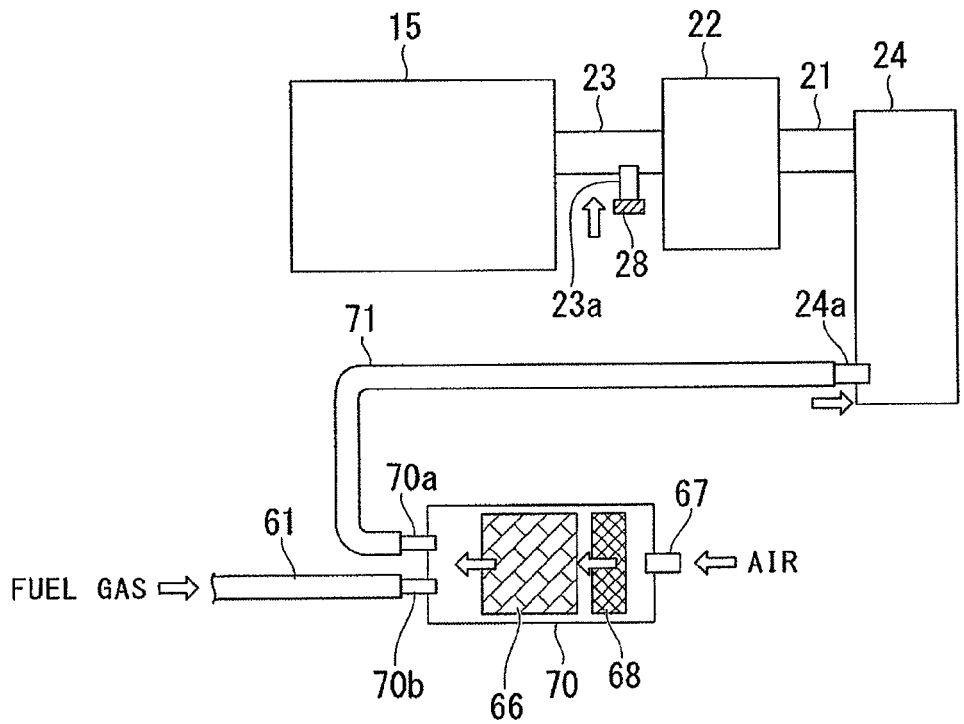
FIG. 3 is a schematic view showing a fuel gas piping system around a canister to be attached to the engine of FIG. 1 related to a second embodiment of the invention.

FIG. 3 is a schematic view showing a fuel gas piping system around a canister to be attached to the engine of FIG. 1 related to the present embodiment. Since all portions other than the fuel gas piping system around the canister shown in FIG. 3 are the same as those of the first embodiment, duplicate description is omitted. In the following, with reference to the schematic view of FIG. 3, the layout of fuel gas piping which leads to the intake system from a canister 70, and the adsorption process of fuel gas will be described.

An inlet port 70b of the canister 70 is connected with the inside of the fuel tank 40 via the rollover valve 60 and the charge tube 61. An outlet port 70a of the canister 70 is connected with a port 24a communicating with a clear section of the air cleaner 24 via a purge pipe 71. The suction port 23a of the heat-insulating intake pipe 23 is tightly blocked by a plug 28. A port 67 at the air section of the canister 70 is opened to the ambient air. A adsorbing material block 66 to which a porous adsorbing material is attached is built inside the canister 70. In addition, a filter element 68 is built at the intake section of the adsorbing material block 66.

After the multipurpose engine 10 has stopped, the fuel tank 40 is warmed by the remaining heat for a while. Thus, the fuel evaporates to generate fuel gas, the internal pressure of the fuel tank 40 rises, and leakage of the fuel gas occurs. The leaked fuel gas enters the canister 70 through the charge tube 61, and is adsorbed by the adsorbing material of the adsorbing material block 66.

When the multipurpose engine 10 operates, negative pressure is generated in the intake system. Ambient air is sucked into the canister 70 through the port 67 by the negative pressure at the clear section of the air cleaner 24. The ambient air sucked into the canister 70 is purified while passing through the filter element 68. The fuel gas adsorbed by the adsorbing material block 66 is degassed by the purified ambient air. The degassed fuel gas is sucked into the air cleaner 24 through the purge pipe 71. Thereby, the fuel gas is recovered, and the canister 70 is recycled. In addition, although slight negative pressure is also applied to the fuel tank 40 by the negative pressure of the air cleaner 24, evaporation of the fuel by the negative pressure is slight, scarcely has an effect on an adsorption action of the adsorbing material block 66, and is effective in eliminating fuel gas leakage.

Third Embodiment

The present embodiment does not have a cylindrical adsorbing material block structure called a canister. Unlike the first and second embodiments, the adsorbing material block is directly housed in the intake system of an engine to perform adsorption, storage, or recovery of a fuel gas. Since all structures other than the above structure are the same as that of the first embodiment, the description of portions excluding different portions is omitted. In the following, with reference to FIG. 4, the adsorbing material block of the present embodiment to be attached to an engine and its surrounding structure will be described.

Figure 4:
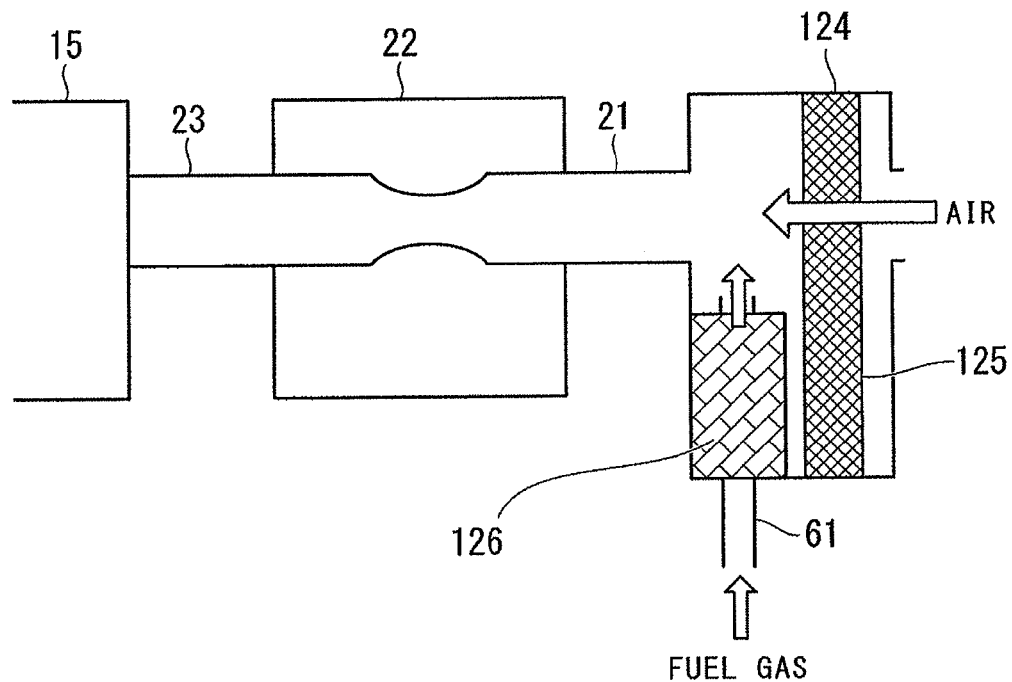
FIG. 4 is a schematic view showing an adsorbing material block to be attached to the engine of FIG. 1 related to a third embodiment of the invention, and its surroundings.

As shown in FIG. 4, an adsorbing material block 126 is housed in a space at a clear section of the air cleaner 124. The adsorbing material block 126 is arranged so as to avoid a passage for the clean air which has passed through a filter element 125 of the air cleaner 124 such that the passage does not become narrow. A charge tube 61 which leads to the fuel tank 40 from the outside is directly connected with the adsorbing material block 126.

After the multipurpose engine 10 has stopped, the fuel tank 40 is warmed by remaining heat for a while. Thus, the fuel evaporates to generate fuel gas, the internal pressure of the fuel tank 40 rises, and leakage of the fuel gas occurs. The leaked fuel gas passes through the charge tube 61, and is adsorbed by the adsorbing material of the adsorbing material block 126 built in the air cleaner 124.

When the multipurpose engine 10 operates, negative pressure is generated in the intake system. The fuel gas adsorbed by the adsorbing material block 126 is degassed by the negative pressure at the clear section of the air cleaner 124. Thereby, the fuel gas is recovered, and the adsorbing material block 126 is recycled. In addition, although slight negative pressure is also applied to the fuel tank 40 by the negative pressure of the air cleaner 124, evaporation of the fuel by the negative pressure is slight, and an adsorption action of the adsorbing material block 126 is effective in eliminating fuel gas leakage.

Fourth Embodiment

The present embodiment does not have a cylindrical adsorbing material block structure called a canister similarly to the above third embodiment, and the adsorbing material block is directly housed in the intake system of an engine to perform adsorption, storage, or recovery of fuel gas. Since all structures other than the above structure are the same as that of the first embodiment, the description of portions excluding different portions is omitted. In the following, with reference to FIG. 5, the adsorbing material block of the present embodiment to be attached to an engine and its surrounding structure will be described.

Figure 5:
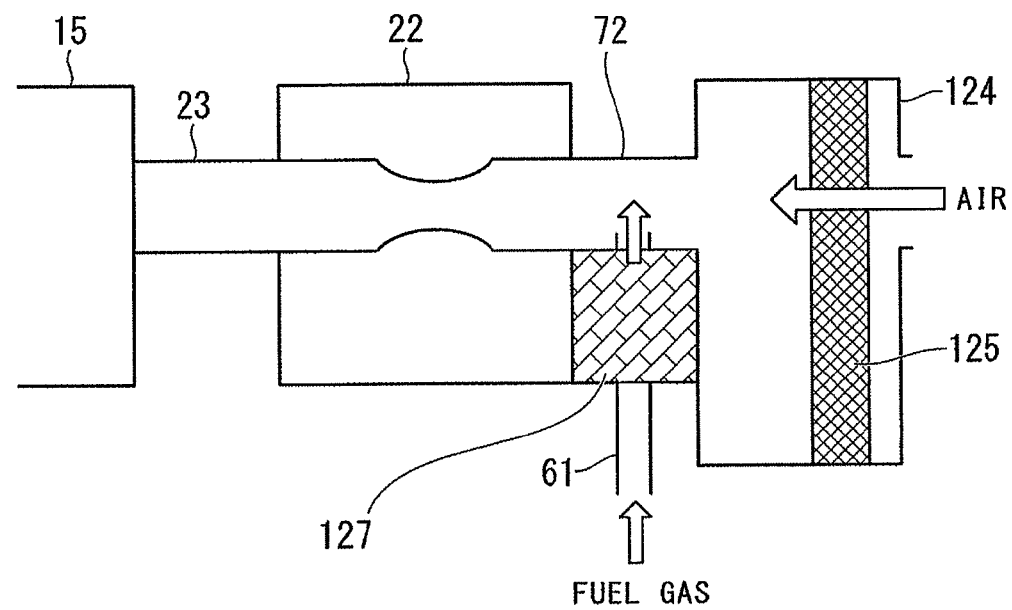
FIG. 5 is a schematic view showing an adsorbing material block to be attached to the engine of FIG. 1 related to a fourth embodiment of the invention, and its surroundings.

As shown in FIG. 5, an overhang chamber is provided at a side of the connecting suction pipe 72 which connects the air cleaner 124 with the carburetor 22. This overhang chamber is arranged so as to avoid a passage for the clean air which has passed through the filter element 125 of the air cleaner 124 such that the passage does not become narrow. An adsorbing material block 127 is housed in this overhang chamber. A charge tube 61 which leads to the fuel tank 40 from the outside is directly connected with the adsorbing material block 127.

After the multipurpose engine 10 has stopped, the fuel tank 40 is warmed by the remaining heat for a while. Thus, the fuel evaporates to generate fuel gas, the internal pressure of the fuel tank 40 rises, and leakage of the fuel gas occurs. The leaked fuel gas passes through the charge tube 61, and is adsorbed by the adsorbing material of the adsorbing material block 127 built in the connecting suction pipe 72.

When the multipurpose engine 10 operates, negative pressure is generated in the intake system. The fuel gas adsorbed by the adsorbing material block 127 of the connecting suction pipe 72 is degassed by the negative pressure. Thereby, the fuel gas is recovered, and the adsorbing material block 127 is recycled. In addition, although slight negative pressure is also applied to the fuel tank 40 by the negative pressure of the intake system, evaporation of the fuel by the negative pressure is slight, and an adsorption action of the adsorbing material block 127 is effective in eliminating fuel gas leakage.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A multipurpose engine in which a fuel gas evaporated within a fuel tank of the engine is drawn out of the fuel tank and is adsorbed by an adsorbing material, the fuel gas is separated from the adsorbing material, and then the fuel gas separated from the adsorbing material is suctioned into an intake system of the engine by using negative pressure inside the intake system, wherein
   the adsorbing material is accommodated in a canister,
   two connection ports used for connection with the canister are respectively provided at a heat-insulating intake pipe between a carburetor and the engine and at a clear section of an air cleaner, wherein
   a filter element is provided at an upstream section of an adsorbing material block inside of the canister so as to be adjacent to the adsorbing material block, a side face of the canister is separately provided with a charge piping connection port to which charge piping of the fuel gas is connected, and a purge piping connection port connected to a clear section in which the negative pressure of the air cleaner is generated,
   a suction port which is opened to ambient air is provided at an upstream section of the filter element,
   the connection port provided at the heat-insulating intake pipe is blocked,
   the purge piping connection port and the air cleaner are distantly positioned, and
   a purge pipe connects the purge piping connection port with the air cleaner.

2. A multipurpose engine in which a fuel gas is drawn out of a fuel tank and is adsorbed by an adsorbing material, the fuel gas is separated from the adsorbing material, and then the fuel gas separated from the adsorbing material is suctioned into an intake system of the engine by using negative pressure inside the intake system, the multipurpose engine comprising:
   an adsorbing material block which is provided inside of an air cleaner at a downstream section of a filter element of the air cleaner so as to be adjacent to the filter element and which is opened to the inside of the air cleaner, the adsorbing material block including the adsorbing material therein and being partitioned so as not to narrow an air passage of the air cleaner; and
   a charging pipe for drawing the fuel gas evaporated within the fuel tank out from the fuel tank and which is opened to the adsorbing material block.

* * * * *